US012691829B2

(12) United States Patent　　　　(10) Patent No.:　US 12,691,829 B2
Katou et al.　　　　　　　　　　　　　(45) Date of Patent:　　　Jul. 28, 2026

(54) VEHICULAR STORAGE COVER MEMBER

(71) Applicant: TOYOTA BOSHOKU KABUSHIKI KAISHA, Aichi-ken (JP)

(72) Inventors: Akinori Katou, Aichi-ken (JP); Tetsuya Yoshida, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 214 days.

(21) Appl. No.: 18/794,082

(22) Filed: Aug. 5, 2024

(65) Prior Publication Data

US 2025/0050812 A1　　Feb. 13, 2025

(30) Foreign Application Priority Data

Aug. 9, 2023　(JP) ................................. 2023-129888

(51) Int. Cl.
　　B60R 5/00　　　　　(2006.01)
　　B60R 5/04　　　　　(2006.01)
(52) U.S. Cl.
　　CPC ................................... B60R 5/044 (2013.01)
(58) Field of Classification Search
　　CPC .. B60R 5/044; B60R 5/02; B60R 5/04; B60R 5/00
　　USPC ...................................................... 296/24.43
　　See application file for complete search history.

(56) References Cited

U.S. PATENT DOCUMENTS

2023/0264749 A1 * 8/2023 Takagi ................ B60R 13/0212
　　　　　　　　　　　　　　　　　　　　　　296/211

FOREIGN PATENT DOCUMENTS

JP　　　　2018-043610　　　3/2018
JP　　　　6661255　　　　　3/2020
KR　　　20220079228 A　*　6/2022 ............... B60R 5/02

* cited by examiner

*Primary Examiner* — Steven O Douglas
(74) *Attorney, Agent, or Firm* — Greenblum & Bernstein, P.L.C.

(57)　　　　　　　　ABSTRACT

A vehicular storage cover member covering an opening of a storage section of a vehicle includes a cover body, a buffer member, and a protection wall. The cover body has a plate shape having a back surface and is disposed such that the back surface is opposite the storage section. The cover body includes an opposing portion that is opposite a support portion of the storage section supporting the cover body. The buffer member has a mount surface with which the buffer member is mounted on a back surface side of the opposing portion. The protection wall projects from the back surface side of the cover body and has a projection dimension that is smaller than a thickness of the buffer member. The protection wall covers the mount surface of the buffer member.

8 Claims, 7 Drawing Sheets

VEHICULAR STORAGE COVER MEMBER

CROSS REFERENCE TO RELATED APPLICATION

This application claims priority from Japanese Patent Application No. 2023-129888 filed on Aug. 9, 2023. The entire contents of the priority application are incorporated herein by reference.

TECHNICAL FIELD

The technology described herein relates to a vehicular storage cover member.

BACKGROUND

A deck board has been known as a cover member for covering a storing portion in a vehicle. The deck board is disposed on an upper surface of a battery case (a storing portion) that is disposed below a vehicular luggage space. Buffer members are provided on a lower surface of the deck board to suppress noise that may be caused due to vibration of the deck board and the battery case.

SUMMARY

When the deck board is mounted on and removed from the luggage space, the buffer member of the deck board may hit a corner portion of the battery case or an object that is stored in the storing portion. This may add a force to the buffer member to be separated from the deck board. Particularly, if the buffer member hits the battery case or the object stored in the storing portion such that the corner portion of the battery case or the object is pushed into a connection portion between the buffer member and the deck board or the corner portion or the object sticks to the adhesive tape that is for fixing the buffer member to the deck board, the buffer member is likely to be separated from the deck board.

The technology described herein was made in view of the foregoing circumstances. An object is to provide a vehicular storage cover member from which a buffer member is less likely to be separated.

The technology described herein is related to a vehicular storage cover member covering an opening of a storage section of a vehicle. The vehicular storage cover member includes a cover body, a buffer member, and a protection wall. The cover body has a plate shape having a back surface and is disposed such that the back surface is opposite the storage section. The cover body includes an opposing portion that is opposite a support portion of the storage section that supports the cover body. The buffer member has a mount surface with which the buffer member is mounted on a back surface side of the opposing portion. The protection wall projects from the back surface side of the cover body and has a projection dimension that is smaller than a thickness of the buffer member. The protection wall covers the mount surface of the buffer member.

DETAILED DESCRIPTION

First Embodiment

Figure 1:
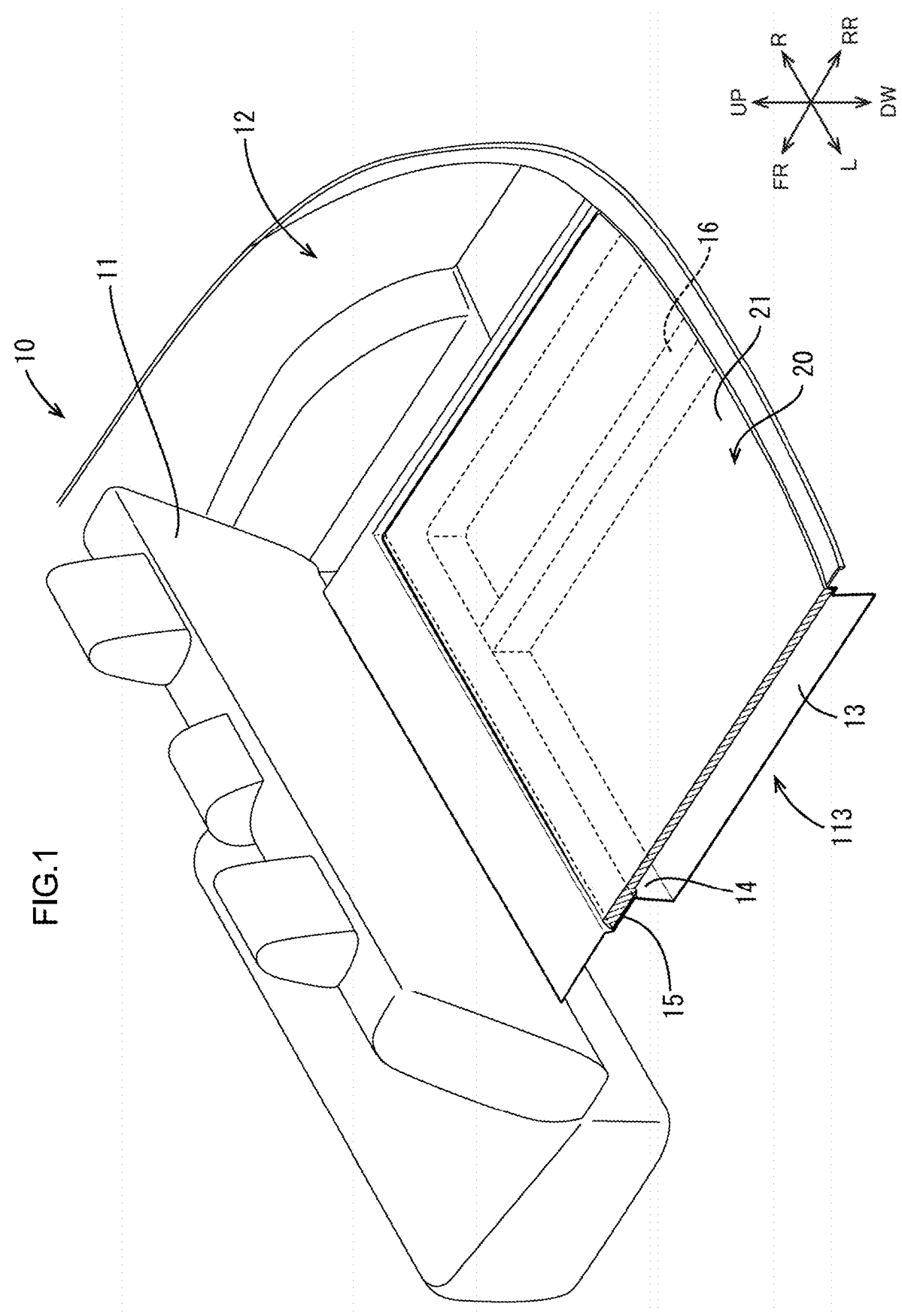
FIG. 1 is a perspective view of a cargo space of a vehicle seen from a rear side.

A deck board 20 (a vehicular storage cover member) of a first embodiment will be described with reference to FIGS. 1 to 6. The deck board 20 is mounted in a cargo space 12 of a vehicle 10. In the drawings, arrows FR and RR point a front side and a rear side with respect to a vehicular front-rear direction, respectively, arrows UP and DW point an upper side and a lower side, respectively, and arrows R and L point a right side and a left side with respect to a vehicular width direction, respectively.

FIG. 1 is a perspective view of a vehicle 10 including a rear door such as a hatchback automobile and a station wagon. The vehicle 10 includes the cargo space 12 behind a rear seat 11. The cargo space 12 is covered by the rear door from a vehicular rear side. With the rear door being open, the cargo space 12 can be accessed such that a luggage can be put therein and taken out therefrom.

A deck board 20 (the vehicular storage cover member) is arranged in the cargo space 12 and configured as a floor of the cargo space 12. A surface of the deck board 20 is defined as a floor surface 21. The deck board 20 includes a board body 20A (one example of a cover body) that is a rectangular plate member. The cargo space 12 includes a storage section 110 below the deck board 20. The storage section 113 includes a storing recess 13 in which a tire and tools can be stored. The deck board 20 (the board body 20A) is horizontally disposed and covers the storing recess 13 from above. As illustrated in FIG. 1, the storage section 113 includes a separation wall 16 (one example of a support portion) that divides an inner space of the storing recess 13. The inner space of the storing recess 13 is defined by peripheral walls 14. The storage section 113 includes flange portions 15 (one example of the support portion) that extend outward from upper edges of the peripheral walls 14. The deck board 20 can be mounted on the storage section 113 to cover an opening of the storing recess 13 by sliding the deck board 20 frontward from a rear side with a back surface 22 of the deck board 20 facing downward.

Figure 2:
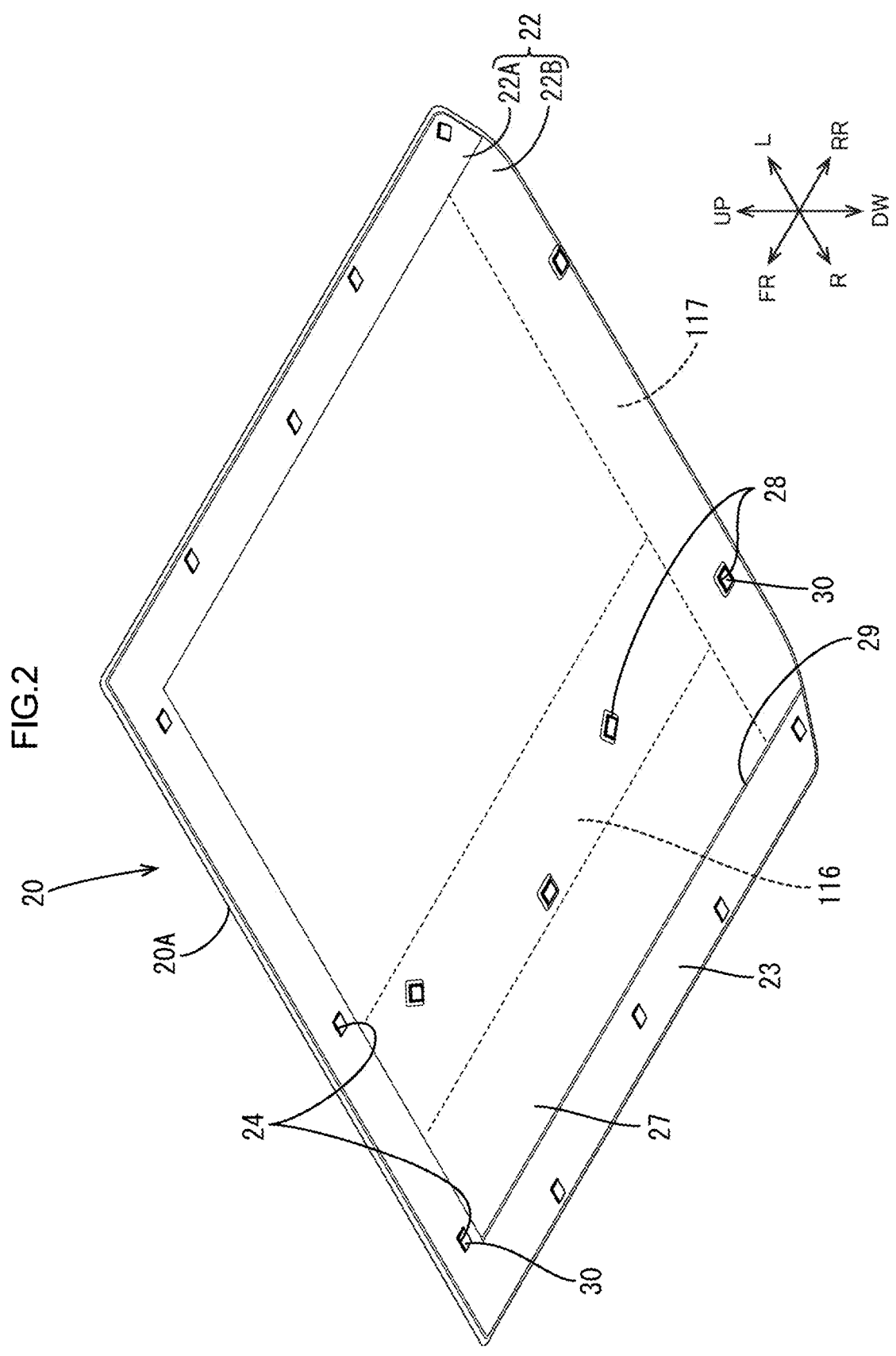
FIG. 2 is a perspective view of a deck board seen from a back surface side.

FIG. 2 is a perspective view of the deck board 20 seen from a back surface 22 (a lower surface) side. The board body 20A of the deck board 20 includes edge portions 23 at a front edge portion and right and left edge portions and a cover portion 27 in a middle portion. The edge portions 23 has a belt shape formed in a U-shape and extends along a right edge, a front edge, and a left edge of the board body 20A. The edge portions 23 are thicker than the cover portion 27. The edge portions 23 (one example of an opposing portion) are to be disposed on the flange portions 15 (refer to FIG. 1).

The cover portion 27 of the board body 20A is disposed to be opposite a storage space of the storing recess 13 and covers the storing recess 13. A step 29 is formed between the edge portions 23 and the cover portion 27 on the back surface 22 of the deck board 20. As illustrated in FIG. 1, the floor surface 21, which is a front surface, of the deck board 20 (the board body 20A) is entirely flat and planar. The edge portions 23 project downward from the cover portion 27.

As illustrated in FIG. 2, the board body 20A includes the edge portions 23 (the opposing portion) that are opposite the flange portions 15 (the support portion), a separation wall opposing portion 116 (the opposing portion) that is opposite the separation wall 16 (the support portion), and a rear edge opposing portion 117 (the opposing portion) that is opposite a portion of a rear trim (the support portion). The separation wall opposing portion 116 and the rear edge opposing portion 117 are portions of the cover portion 27. Buffer members 30 are on the opposing portions including the edge portions 23, the separation wall opposing portion 116, and the rear edge opposing portion 117. The buffer members 30 have a block shape (cube shape) and may be made of urethane or non-woven fabric. The board body 20A does not directly come in contact with the flange portions 15, the separation wall 16, and the rear trim since the buffer members 30 are between the board body 20A and each of the flange portions 15, the separation wall 16, and the rear trim. Therefore, noise is less likely to be caused due to vibration caused by vehicle's running. The buffer members 30 may be fixed to the board body 20A with any method such as bonding with adhesive, attaching with an adhesive tape, supersonic welding, and thermal welding. In this embodiment, as illustrated in FIGS. 5 and 6, the buffer members 30 are fixed to the board body 20A with adhesive tapes 33.

The deck board 20 of this embodiment includes walls (one example of a protection wall) on the back surface 22 side of the board body 20A and surround the buffer members 30. The back surface 22 of the edge portion 23 is defined as a back surface 22A and the back surface 22 of the cover portion 27 is defined as a back surface 22B. The walls on the back surface 22A side of the edge portion 23 and the walls on the back surface 22A side of the cover portion 27 have different configurations.

Figure 3:
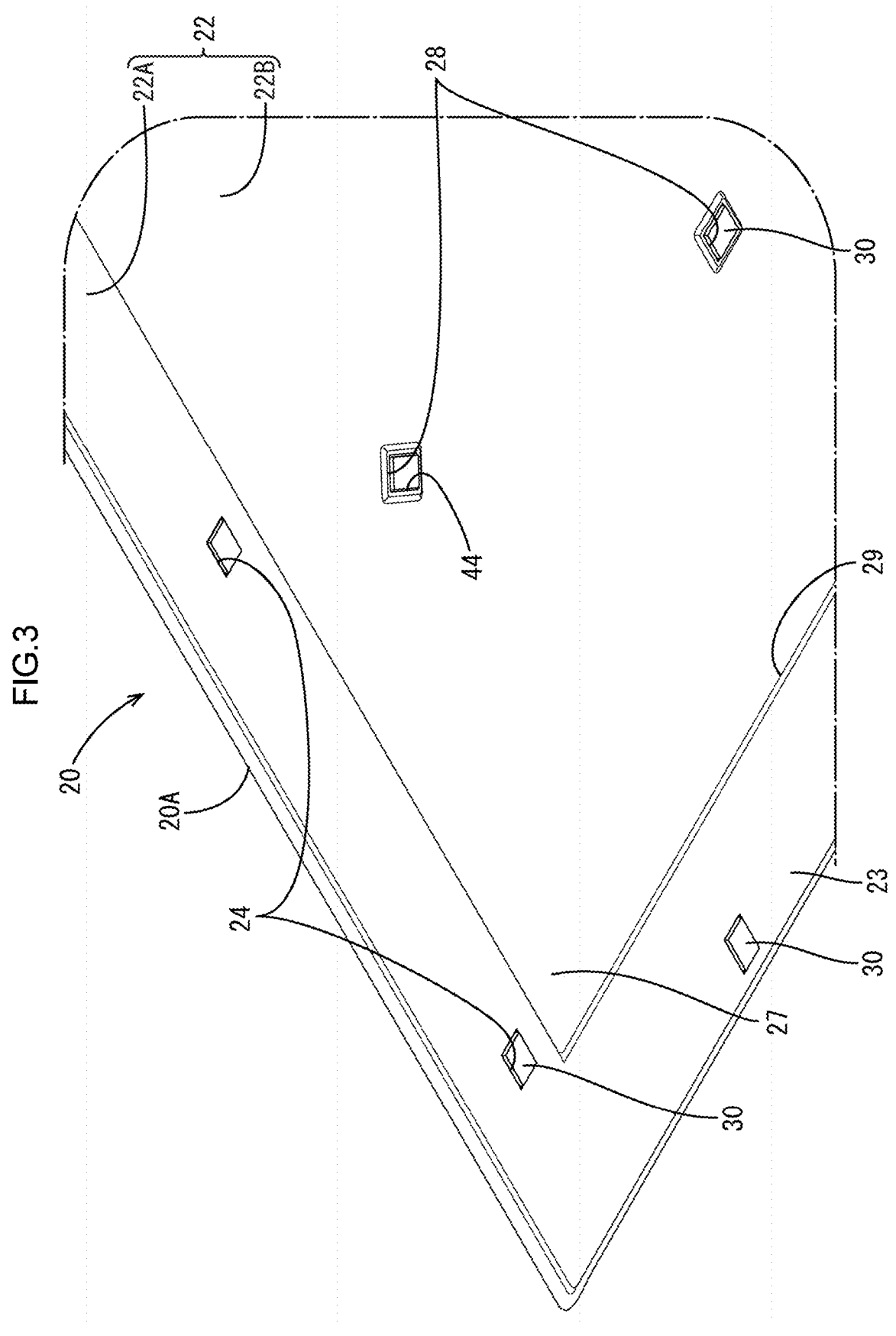
FIG. 3 is an enlarged perspective view of a portion of the deck board.
Figure 4:
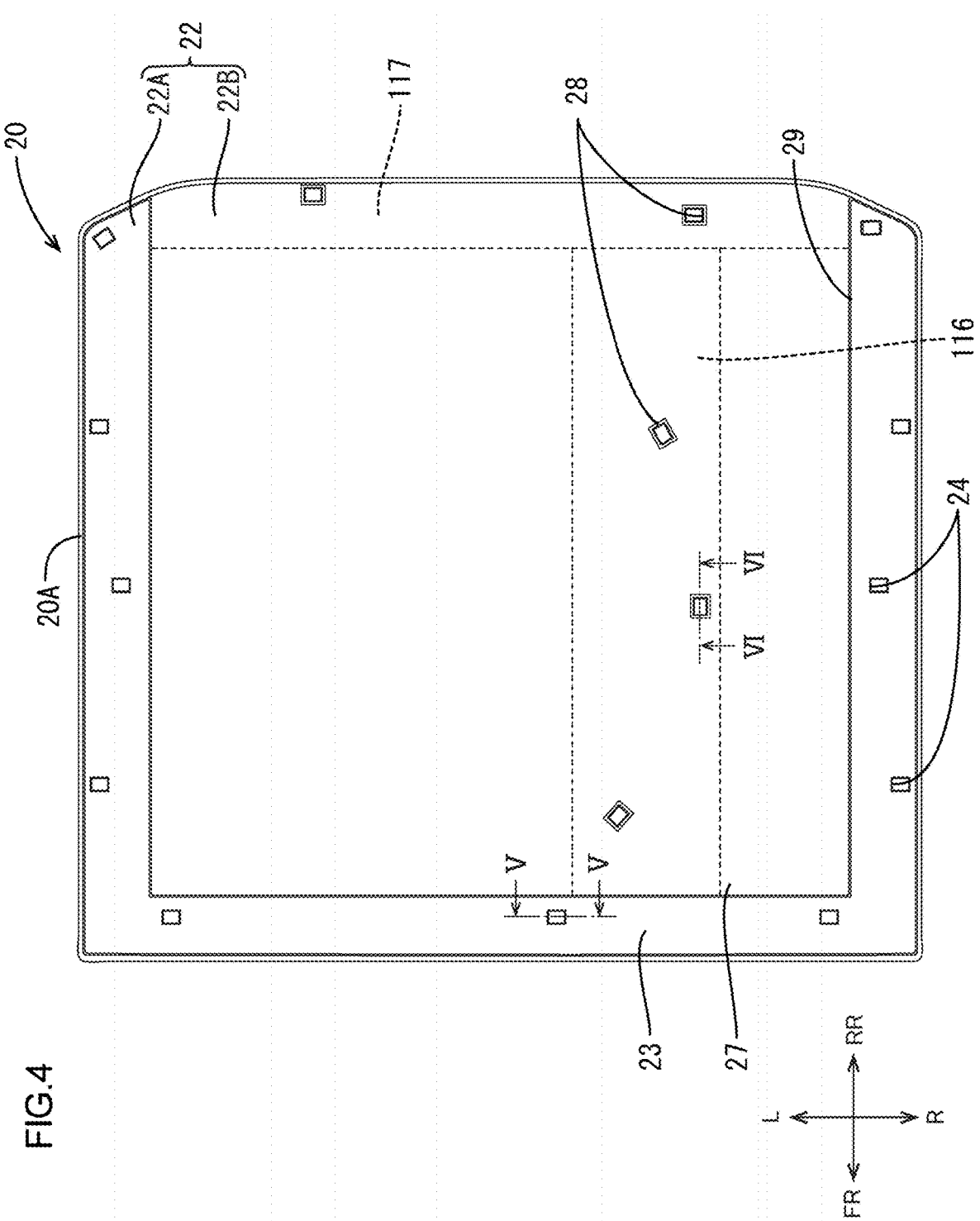
FIG. 4 is a bottom view of the deck board.
Figure 5:
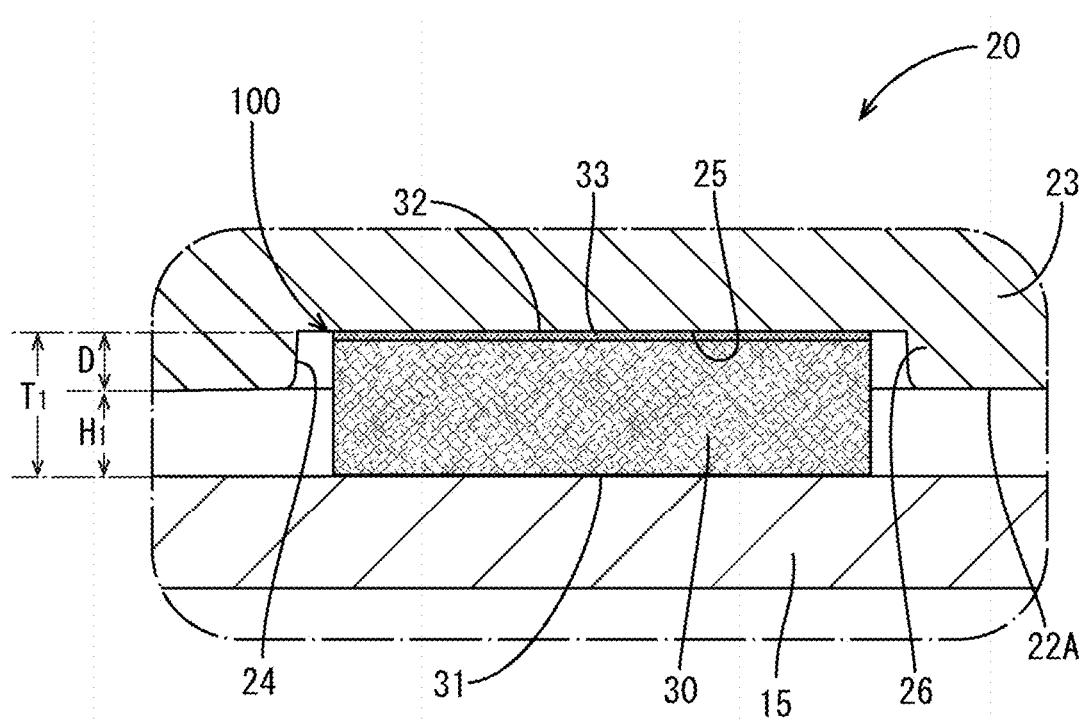
FIG. 5 is a cross-sectional view of a portion of the deck board along line V-V in FIG. 4.
Figure 6:
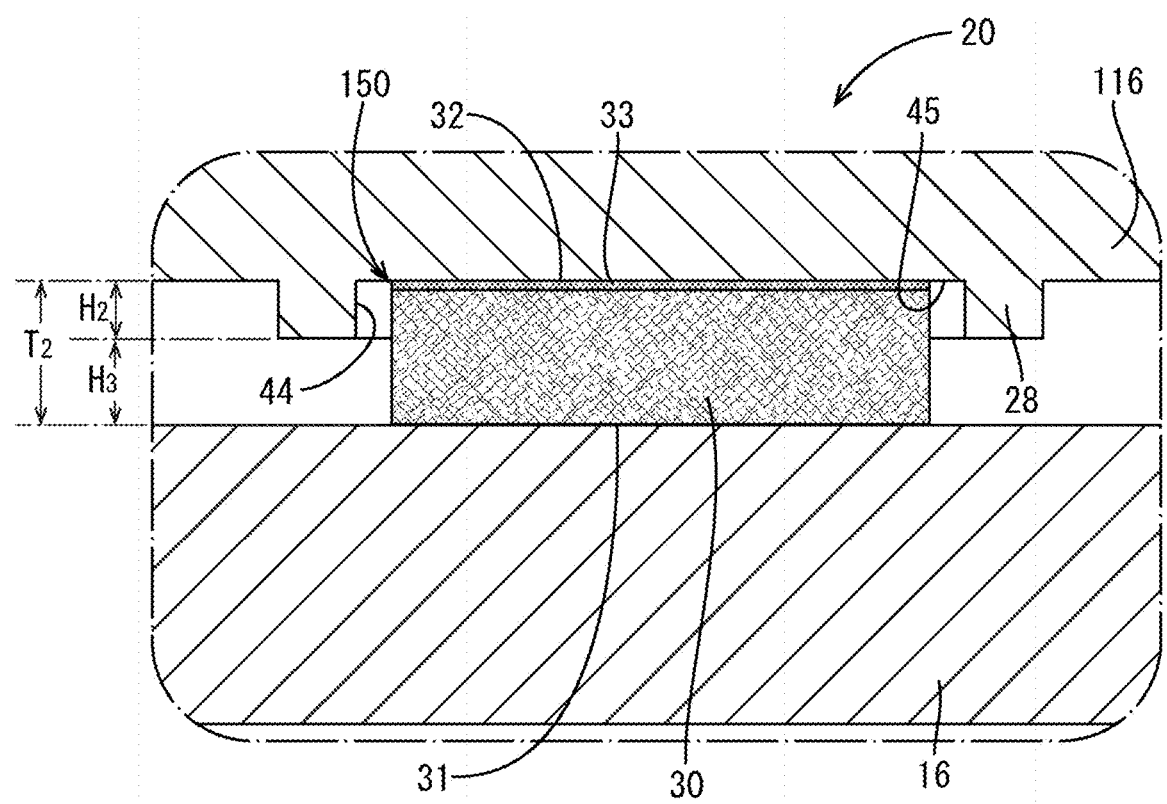
FIG. 6 is a cross-sectional view of a portion of the deck board along line VI-VI in FIG. 4.

As illustrated in FIGS. 3 and 5, the edge portion 23 includes recesses 24 that are recessed from the back surface 22A and in which the buffer members 30 can be fitted. With the buffer member 30 being fitted and fixed in the recess 24, the buffer member 30 is surrounded by inner walls 26 of the recess 24. The recess 24 has a depth D that is smaller than a thickness T1 of the buffer member 30 including the adhesive tape 33 (D<T1).

As illustrated in FIG. 5, with the buffer member 30 being fixed to a bottom 25 (one example of a mount portion) of the recess 24, the buffer member 30 projects further from the back surface 22A of the edge portion 23. Namely, a lower surface 31 (one example of an outer surface) of the buffer member 30 is lower than the back surface 22A of the edge portion 23 by a projection dimension H1. With the buffer member being fixed to the bottom 25 of the recess 24, the lower surface 31 of the buffer member 30 is not on a same level as the back surface 22A. The buffer member 30 projects further than the top ends of the inner walls 26 and is lower than the top ends of the inner walls 26. The top ends of the inner walls 26 are portions of the back surface 22A. With the buffer member 30 being fitted in the recess 24 and fixed to the bottom 25 of the recess 24, a connection portion 100 of the bottom 25 and a mount surface 32 of the buffer member 30 is covered by inner walls 26 (one example of the protection walls) of the recess 24 from a lateral direction (specifically, the front-rear direction and the right-left direction). Namely, the mount surface 32 of the buffer member 30 that is fixed to the bottom 25 of the recess 24 is covered by the inner walls 26. The inner walls 26 of the recess 24 are defined as the protection walls.

The depth D of the recess 24 is preferably 0.5 mm or greater. With the depth D of the recess 24 being 0.5 mm or greater, any foreign obstacles are less likely to reach the connection portion 100 of the bottom 25 of the recess 24 and the mount surface 32 of the buffer member 30. Namely, with such a configuration, any foreign obstacles are less likely to reach the mount surface 32 of the buffer member 30 that is fixed to the bottom 25 of the recess 24.

As illustrated in FIGS. 3 and 6, the separation wall opposing portion 116 of the cover portion 27 includes projection walls 28 (one example of the protection walls) that project from the back surface 22B. The projection walls 28 are configured to have a loop shape seen from a top end and surround the buffer members 30. A recess 44 is formed inside the loop-shaped projection walls 28. A portion of the back surface 22B is configured as a bottom 45 (the mount portion) of the recess 44. The buffer member 30 is mounted on the bottom 45. The projection walls 28 have a projection dimension H2 (height) that is smaller than a thickness T2 of the buffer member 30 including the adhesive tape 33 (H2<T2).

As illustrated in FIG. 6, with the buffer member 30 being fixed to the bottom 45 (the mount portion) of the recess 44 that is defined by the projection walls 28, the buffer member 30 projects further than projection top ends (lower ends) of the projection walls 28 by a projection dimension H3. Namely, the lower surface 31 (the outer surface) of the buffer member 30 that is fixed to the bottom 45 (corresponding to the portion of the back surface 22B) of the recess 44 surrounded by the projection walls 28 is not on a same level as the projection top ends of the projection walls 28. The lower surface 31 of the buffer member 30 is lower than the projection top ends of the projection walls 28. With the buffer member 30 being fitted in the recess 44 surrounded by the projection walls 28 and fixed to the bottom 45 of the recess 44, a connection portion 150 of the bottom 45, which is a portion of the back surface 22B, and the mount surface 32 of the buffer member 30 is covered by the projection walls 28 (the protection walls) from the lateral direction (specifically, the front-rear direction and the right-left direction). Namely, the mount surface 32 of the buffer member 30 that is fixed to the portion of the back surface 22B is covered by the projection walls 28. The projection walls 28 are defined as the protection walls.

The projection dimension H2 of the projection walls 28 from the back surface 22B is preferably 0.5 mm or greater. With the projection dimension H2 of the projection walls 28 being 0.5 mm or greater, any obstacles are less likely to reach the connection portion 100 of the bottom 45 (the back surface 22B) and the mount surface 32 of the buffer member 30. The thicknesses T1, T2 of the buffer member 30 that is mounted on the edge portion 23 and the separation wall opposing portion 116 can be determined as appropriate according to the depth D of the recess 24, the projection dimension H2 of the projection walls 28, and the position of the flange portion 15 and the upper edge of the separation wall 16.

In covering the opening of the storing recess 13 with the deck board 20 of this embodiment, the deck board 20 is moved frontward from the vehicular rear side with the back surface 22 facing downward. While a deck board, which does not include the inner walls 26 or projection walls 28 covering the buffer member 30, moving, the buffer members may hit a corner portion between the peripheral wall 14 and the flange portion 15, a corner of the separation wall 16, or an object stored in the storing recess 13 such as a tire. In such a situation, a force is added to the buffer member to be separated from the back surface of the deck board and the buffer member may be separated from the back surface. Particularly, if the buffer member hits the corner portion or the object and the corner portion of the object is pushed into a connection portion between the mount surface of the buffer member and the deck board or sticks to the adhesive tape on the mount surface of the buffer member, the buffer member is more likely to be separated from the deck board.

According to the deck board 20 of this embodiment, the connection portion 100, 150 between the back surface 22 of the board body 20A and the mount surface 32 of the buffer member is covered by the inner walls 26 or the projection walls 28 from a lateral side (an outer peripheral side) of the buffer member 30. Therefore, the buffer member 30 is less likely to hit the corner portion or the object stored in the storing recess 13. Even if a portion of the buffer member 30 that projects further from the inner wall 26 or the projection wall 28 (a portion away from the mount surface 32) hits any obstacle, strong force is less likely to be added to the buffer member 30 and the buffer member 30 is deformed such that the deck board 20 can move without separating the buffer member 30 from the board body 20A.

Next, operations and effects of this embodiment will be described. The deck board 20 of this embodiment includes the board body 20A and the buffer members 30. The board body 20A has a plate shape and is disposed such that the back surface 22 of the board body 20A faces the storing recess 13. The buffer members 30 are mounted on the back surface 22 side of the edge portions 23, which are opposite the flange portions 15, and the separation wall opposing portion 116, which is opposite the separation wall 16. The buffer member 30 has the mount surface 32 with which the buffer member 30 is mounted on the bottom 25, 45. The inner walls 26 and the projection walls 28 are on the back surface 22. The inner walls 26 have a height (the depth D) that is smaller than the thickness T1 of the buffer member 30 and cover the mount surface 32 with respect to the bottom 25 from an outer peripheral side of the mount surface 32. The projection walls 28 have a height (the projection dimension H2) that is smaller than the thickness T2 of the buffer member 30 and cover the mount surface 32 with respect to the bottom 45 (the back surface 22B) from the outer peripheral side of the mount surface 32.

According to the above configuration, with the inner walls 26 and the projection walls 28, the corner portion of the storing recess 13 or the object stored in the storing recess 13 is less likely to hit the mount surface 32 of the buffer member 30 and less likely to enter the connection portion between the mount surface 32 and the bottom 25, 45. Therefore, the buffer member 30 is less likely to be separated from the board body 20A.

The opening of the storing recess 13 is covered by the deck board 20 by sliding the deck board 20 along the opening in the vehicular front-rear direction. The projection walls 28 that project from the back surface 22 are disposed on the front side and the rear side of the buffer member 30.

The corner portion of the storing recess 13 or the object stored in the storing recess 13 is likely to hit the buffer member 30 from the front side and the rear side in the mounting and removing of the deck board 20 with the sliding operation. With the projection walls 28 being disposed to cover the portions of the buffer member 30 that are likely to be hit, the separation of the buffer member 30 is surely suppressed.

Second Embodiment

Next, a second embodiment will be described with reference to FIG. 7. In the following, configurations that are different from those of the first embodiment will be described and the configurations similar to those of the first embodiment are represented by the same symbols and will not be described.

Figure 7:
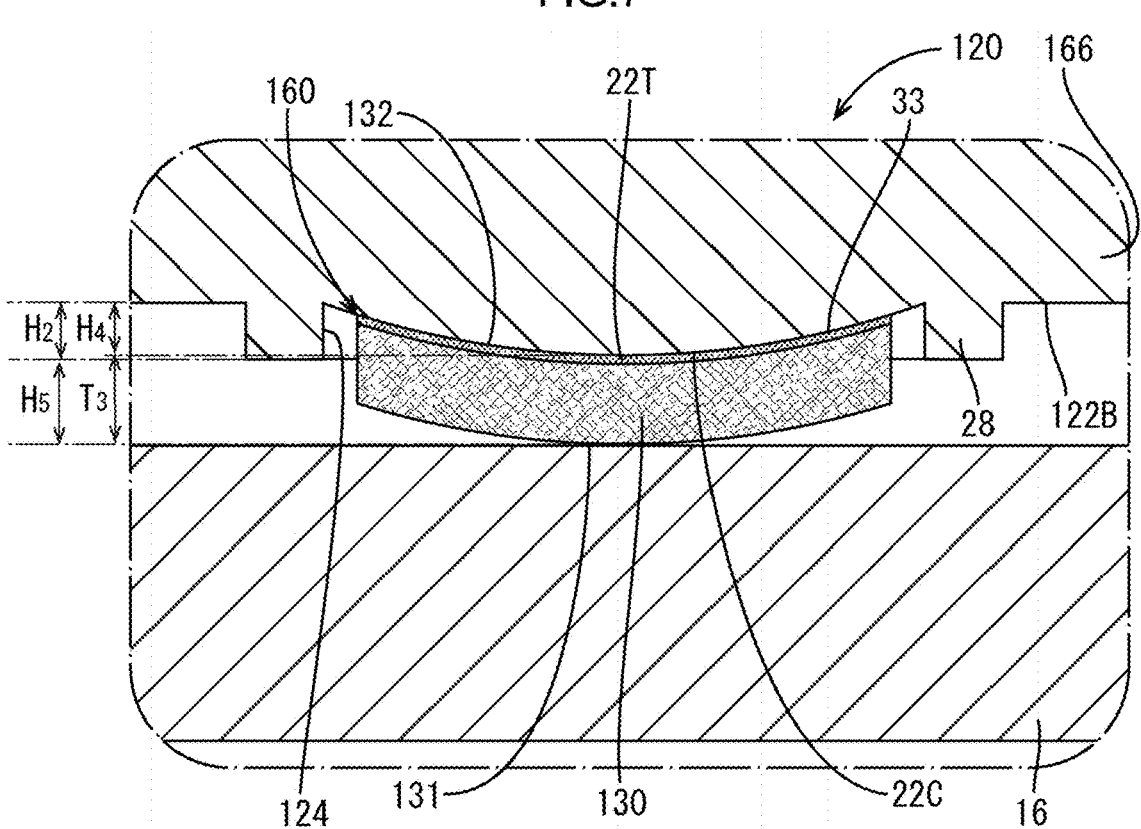
FIG. 7 is a cross-sectional view of a portion of a deck board according to a second embodiment along a vehicular front-rear direction.

As illustrated in FIG. 7, a deck board 120 of this embodiment includes the projection walls 28 of a loop shape that project from a back surface 122B of a separation wall opposing portion 166 of a cover portion. A buffer member 130 is mounted on a bottom 22C (the mount portion, a projection portion) of a recess 124 that is surrounded and defined by the projection walls 28. This embodiment differs from the first embodiment in that the bottom 22C projects downward and has an arched shape.

A projection dimension (height) H4 of the bottom 22C measured from a back surface 122B of the separation wall opposing portion 166 of the cover portion to a top 22T (a lowest end) of the bottom 22C is preferably smaller than the projection dimension (height) H2 of the projection walls 28 measured from the back surface 122B to the top ends of the projection walls 28 (H4<H2). Namely, the projection wall 28 projects further than the bottom 22C projects. The projection dimension H2 of the projection walls 28 from the back surface 122B is preferably 0.5 mm or greater.

A projection dimension H5 of the buffer member 30 measured from the top end of the projection wall 28 to the top 22T of the bottom 22C is nearly equal to the projection dimension H3 of the buffer member 30 from the top end of the projection wall 28 in the configuration (the configuration of the first embodiment) without having the projecting bottom 22C (H5≈H3). With such a configuration, vibration can be effectively absorbed by the deformation of the buffer member 130. The lower surface 131 (the outer surface) of the buffer member 130 is lower than the projection wall 28 by the projection dimension H5.

According to this embodiment, similar to the first embodiment, foreign obstacles are less likely to be pushed into a connection portion 160 between the bottom 22C of the recess 124 on the back surface 122B side of the separation wall opposing portion 166 and the mount surface 132 of the buffer member 130. Additionally, a thickness T3 of the buffer member 130 can be smaller than that of the first embodiment (T3<T2). Therefore, a manufacturing cost (a material cost) can be suppressed.

OTHER EMBODIMENTS

The present disclosure is not limited to the embodiment described above and illustrated in the drawings. The following embodiments may be included in the technical scope of the technology described herein.

Figure 8:
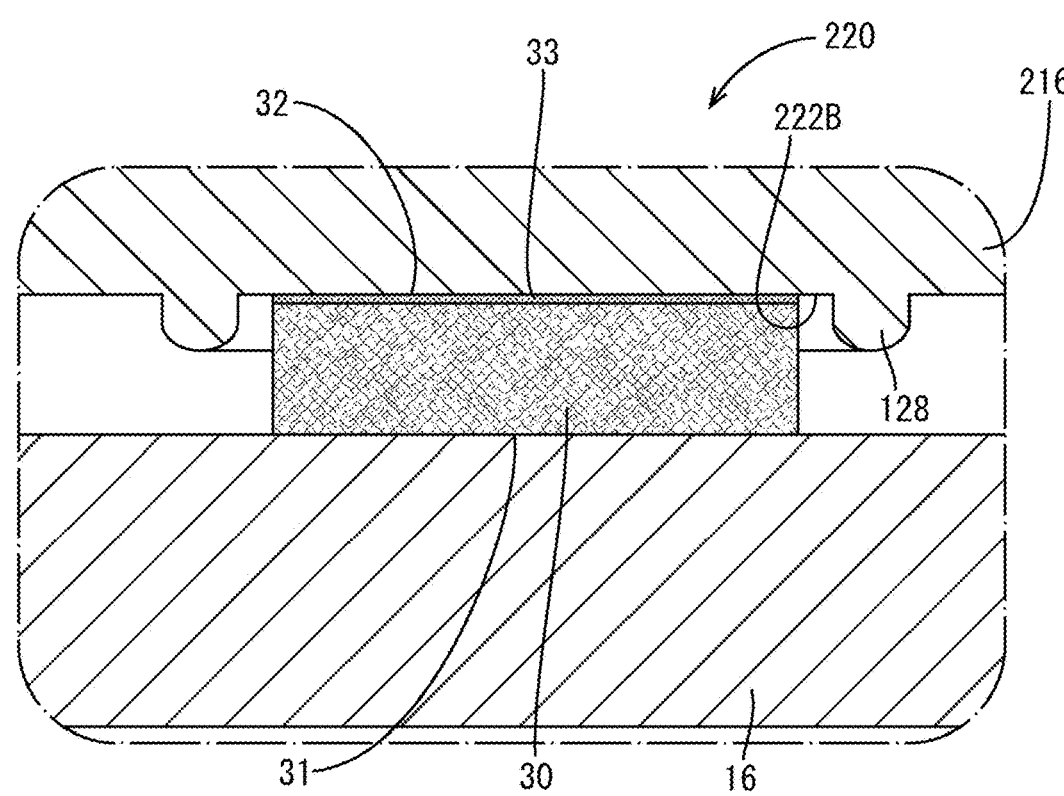
FIG. 8 is a cross-sectional view of a portion of a deck board according to another embodiment along a vehicular front-rear direction.

(1) In the configuration of the deck board 20 of this embodiment, as illustrated in FIGS. 6 and 7, the top ends (lower ends) of the projection walls 28 have edges; however, as illustrated in FIG. 8, a separation wall opposing portion 216 of a cover portion of a deck board 220 may include projection walls 128 that have round shaped top ends.

(2) In the configurations of the deck boards 20, 120 of the above embodiments, the separation wall opposing portions 116, 166 of the cover portions include the projection walls 28 of a loop shape. However, two projection walls may be disposed on a front side and a rear side of the buffer member, respectively, to extend parallel to each other in a direction crossing the sliding direction of the deck board and no walls may be provided on a right side and a left side. The projection walls having such a configuration may be particularly effectively used for the buffer member having a long shape elongated in a right-left direction.

Figure 9:
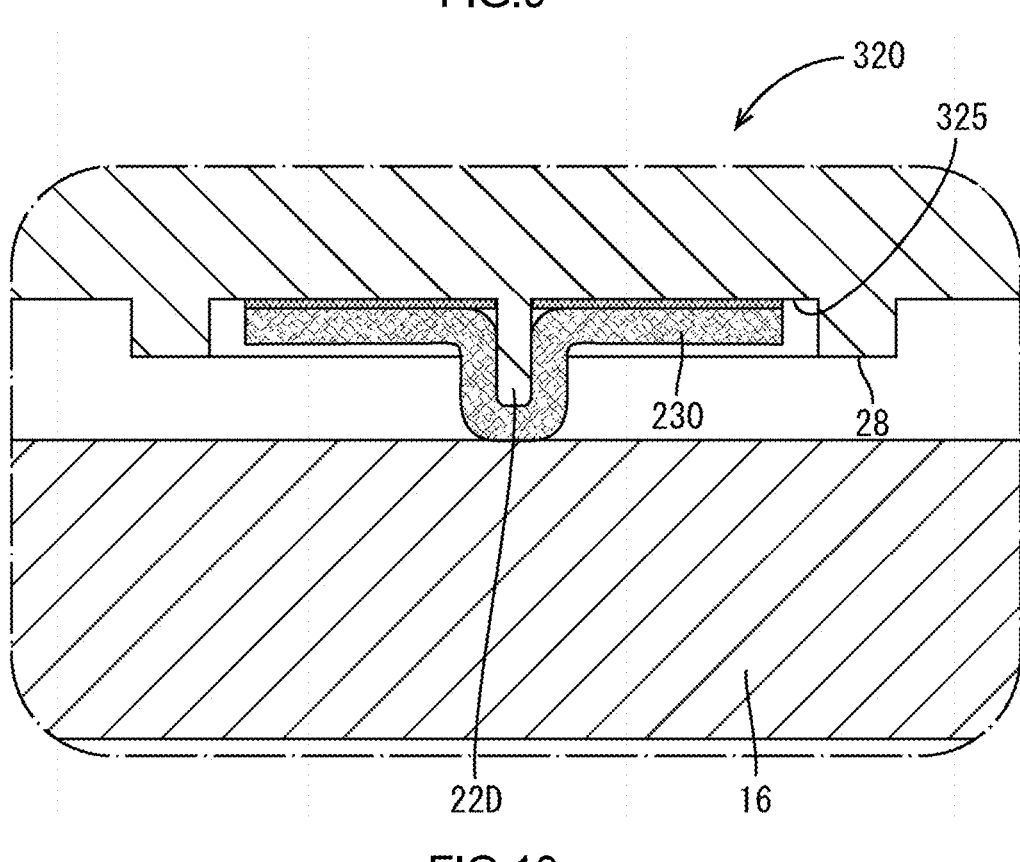
FIG. 9 is a cross-sectional view of a portion of a deck board according to other embodiment along the vehicular front-rear direction.

(3) In the second embodiment, the bottom 22C of the recess 124 that is surrounded by the loop-shaped projection wall 28 and on which the buffer member 130 is mounted has an arched shape projecting downward. However, as illustrated in FIG. 9, a bottom 325 (the mount portion) where a buffer member 230 is mounted may include a rib-shaped projection 22D (the projection portion) that projects downward.

Figure 10:
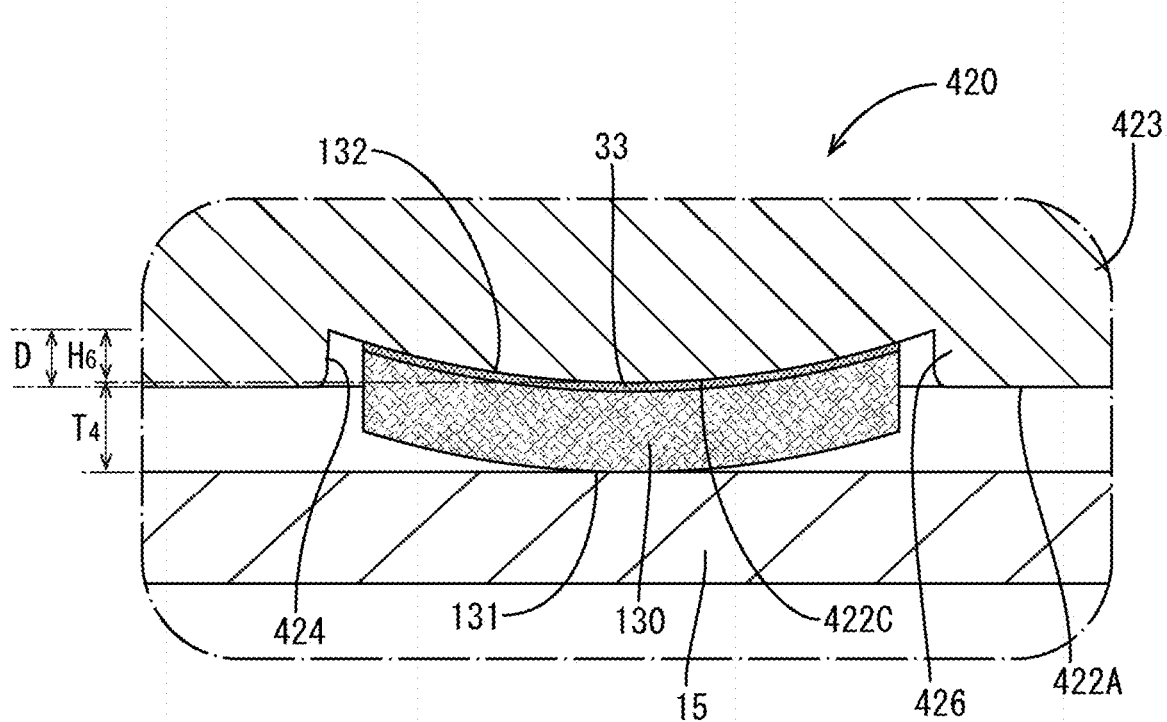
FIG. 10 is a cross-sectional view of a portion of a deck board according to other embodiment along a vehicular width direction.

(4) In the second embodiment, the bottom 22C that projects downward is inside the projection walls 28 on the separation wall opposing portion 166. However, as illustrated in FIG. 10, a bottom 422C (the mount portion, the projection portion), which has a projection dimension H6 (H6<D) or a projection may be included in a recess 424 that is formed in a back surface 422A of an edge portion 423. The recess 424 includes inner walls 426 and the buffer member 130 that is disposed in the recess 424 is surrounded by the inner walls 426. According to such a configuration, the thickness T4 of the buffer member 130 can be made smaller than the first embodiment (T4<T1) and a cost for material can be reduced.

(5) In the above embodiments, the deck board 20, 120, 220, 320, 420 that is mounted in the cargo space 12 of the vehicle 10 is described as the vehicular storage cover member. However, the technology described herein is not necessarily applied to the deck board but may be applied to a tonneau board, which is another example of the vehicular storage cover member and vehicular storage cover members included in a train, an aircraft, and ships with various modifications.

The invention claimed is:

1. A vehicular storage cover member covering an opening of a storage section of a vehicle, the vehicular storage cover member comprising:

a cover body that has a plate shape having a back surface and is disposed such that the back surface is opposite the storage section, the cover body including an opposing portion that is opposite a support portion of the storage section supporting the cover body;

a buffer member having a mount surface with which the buffer member is mounted on a back surface side of the opposing portion; and a protection wall projecting from the back surface side of the cover body and having a projection dimension that is smaller than a thickness of the buffer member, the protection wall covering the mount surface of the buffer member.

2. The vehicular storage cover member according to claim 1, wherein the opposing portion includes a mount portion where the buffer member is mounted, and the mount portion includes a projection portion on which the buffer member is mounted and the projection portion projects such that an outer surface of the buffer member that is an opposite surface from the mount surface is disposed on an outer side than the protection wall.

3. The vehicular storage cover member according to claim 1, wherein the vehicular storage cover member is configured to cover the opening of the storage section by a sliding operation along the opening of the storage section, and the protection wall extends at least in a direction crossing a direction of the sliding operation.

4. The vehicular storage cover member according to claim 1, wherein the protection wall includes a front protection wall that is on a vehicular front side of the buffer member and a rear protection wall that is on a vehicular rear side of the buffer member.

5. The vehicular storage cover member according to claim 1, wherein the protection wall extends around the buffer member.

6. The vehicular storage cover member according to claim 2, wherein the protection wall projects further than the projection portion.

7. The vehicular storage cover member according to claim 1, wherein the protection wall includes protection walls, and the opposing portion includes a recess that is defined by the protection walls and in which the buffer member is arranged.

8. The vehicular storage cover member according to claim 1, wherein the buffer member includes buffer members, the protection wall includes protection walls, the cover body includes a first portion having a first thickness and a second portion having a second thickness and the first thickness is greater than the second thickness, the opposing portion includes a first opposing portion that is a portion of the first portion and a second opposing portion that is a portion of the second portion, the first opposing portion includes a recess in the back surface in which one of the buffer members is arranged and some of the protection walls extend from the back surface as side walls of the recess, and other ones of the protection walls project from the back surface of the second opposing portion and another one of the buffer members is arranged between the other ones of the protection walls.

* * * * *